United States Patent [19]

Winfield

[11] Patent Number: 4,720,080
[45] Date of Patent: Jan. 19, 1988

[54] TOOL FOR SPREADING TIRE SIDEWALLS

[75] Inventor: Mason C. Winfield, Orchard Park, N.Y.

[73] Assignee: Astronics Corporation, Orchard Park, N.Y.

[21] Appl. No.: 14,235

[22] Filed: Feb. 12, 1987

[51] Int. Cl.⁴ ............................................. B68C 25/14
[52] U.S. Cl. .................................................. 254/50.1
[58] Field of Search .............. 254/113, 116, 50.1–50.4, 254/243, 244, 261

[56] References Cited

U.S. PATENT DOCUMENTS

| | | | |
|---|---|---|---|
| 782,169 | 2/1905 | Opocensky | 254/243 |
| 786,651 | 4/1905 | Lanning et al. | 254/243 |
| 1,325,552 | 12/1919 | Woodworth | 254/50.1 |
| 1,350,779 | 8/1920 | Curdinell | 254/50.1 |
| 1,429,977 | 9/1922 | Smith | 254/243 |
| 2,928,119 | 3/1960 | Fassero et al. | 254/50.3 |

FOREIGN PATENT DOCUMENTS 988013  4/1976  Canada ................................. 254/113

Primary Examiner—Robert C. Watson
Attorney, Agent, or Firm—Shlesinger Fitzsimmons Shlesinger

[57] ABSTRACT

A rigid, metal strap has a hook formed on one end and a handle on the other. The hook is disposed to be inserted between a tire rim and a surrounding, tubeless tire, only one sidewall of which (the inboard side) has been mounted on the rim. The inner, terminal end of the hook is engaged with and retains the bead on the inboard side of the tire against the circumferential flange formed on one side of the rim. An adjustable clamp on the strap is releasably clamped to the opposite side of the rim to secure the strap to the rim and therefore to hold the inboard tire bead against movement. A turnbuckle is pivotally mounted at one end on the strap adjacent its handle and has a hook on its opposite end engageable with the outboard bead of the tire, so that by adjusting the turnbuckle the outboard side of the tire can be spread away from the rim.

11 Claims, 5 Drawing Figures

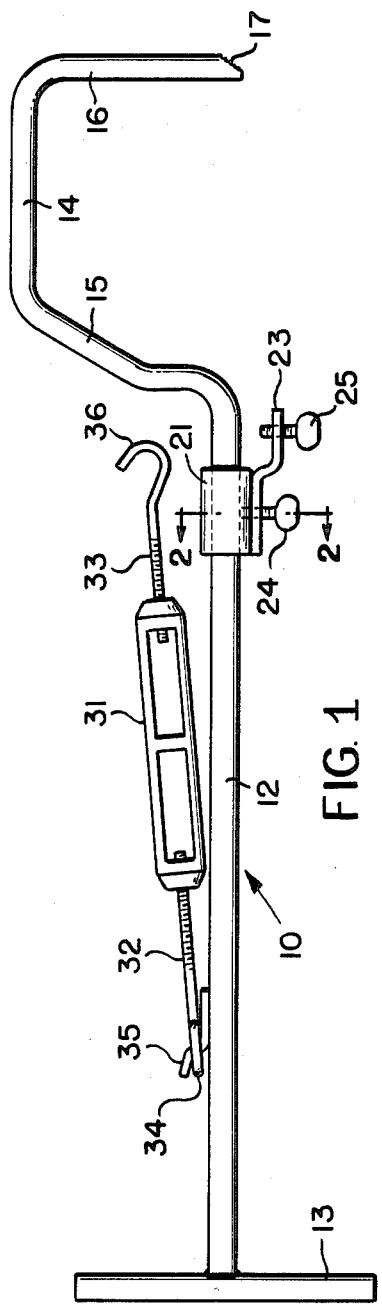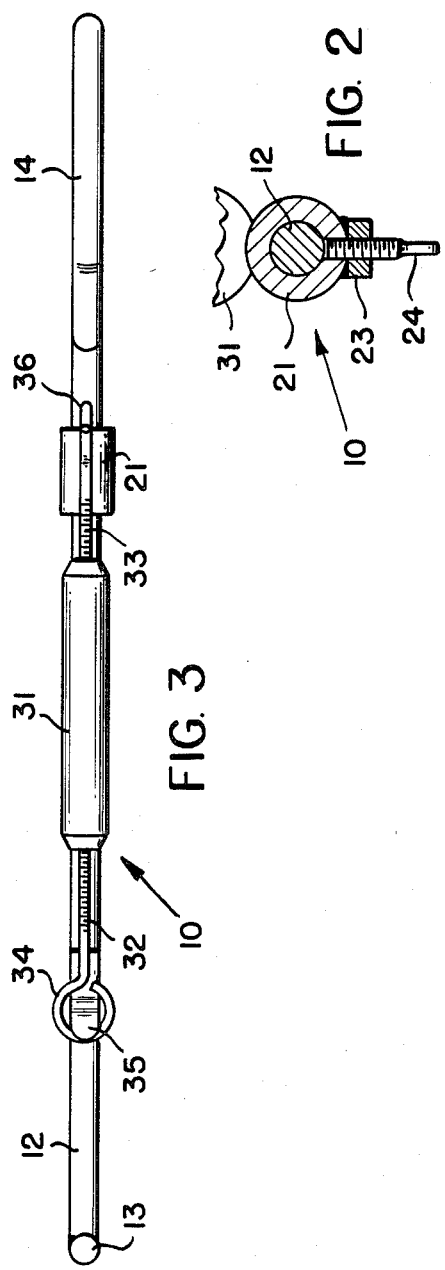

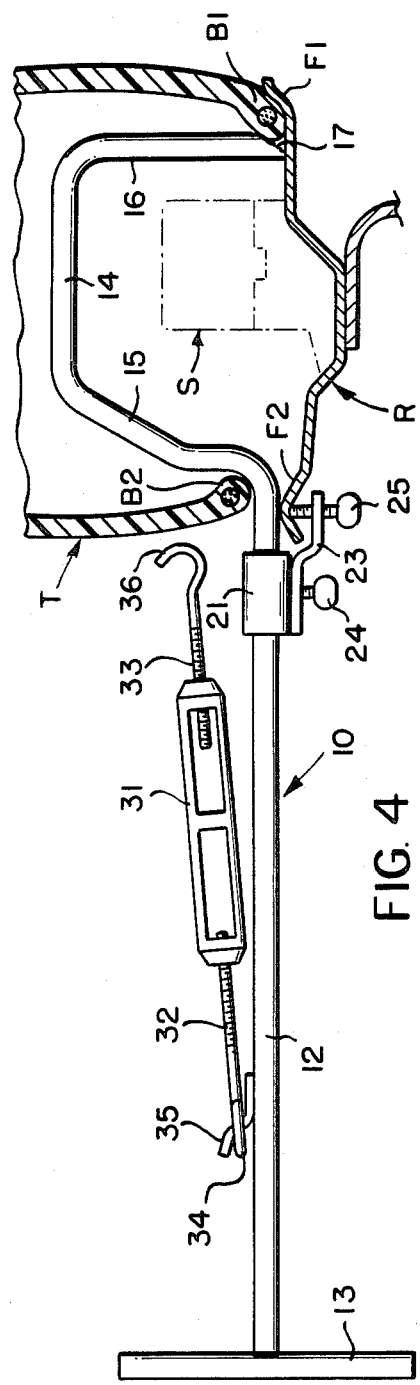
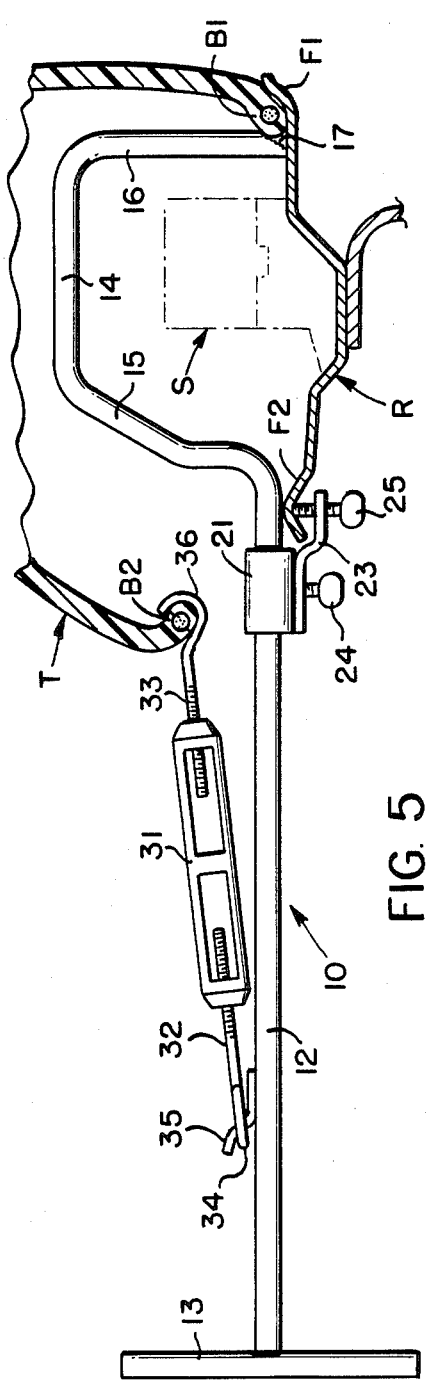

TOOL FOR SPREADING TIRE SIDEWALLS

BACKGROUND OF THE INVENTION

This invention relates to tubeless tires, and more particularly to a novel tool for spreading the sidewalls of a tire, while mounted on a rim, in order to achieve access to a runflat device mounted on the rim within the tire.

In recent years a variety of so-called runflat devices, or tire safety liners, have been developed to prevent the destruction of an inflated tire when it becomes deflated during the operation of an associated vehicle. One such safety device is disclosed in U.S. Pat. No. 4,393,911, which is assigned to the same assignee as the present application. The device disclosed in this particular patent includes a flexible, generally C-shaped liner or bearing strip which is secured around the central section of a conventional tire rim. Secured around this bearing liner for rotation thereon, when the associated tire becomes flat, is a circular ring which is made from a sturdy, shock-resistant plastc material.

Runflat devices of the type described above are adapted to be mounted on both a two-piece vehicle rim of the type commonly employed on military vehicles and the like, as well as upon conventional, one-piece automobile tire rims of the drop center variety. This particular invention is concerned with the one-piece, drop center type of rim.

In order to mount runflat devices of the type described on a conventional automobile rim, it is necessary first to insert one side of the tire onto the rim, and then to mount the runflat device within the tire before mounting the other side of the tire on the rim. This operation creates certain difficulties, since the inboard side of the tire, which is first inserted onto the rim, tends to slide axially back toward the center of the rim during the insertion of the runflat device thus making it extremely difficult for an operator or mechanic to gain access to the space surrounding the rim. There is a need, therefore, for some type of instrument to restrain axial movement of the inboard side of the tire during the insertion of a runflat device onto the rim.

It is an object of this invention, therefore, to provide a relatively simple and inexpensive device for releasably restraining the inboard side of a tubeless tire against axial movement on an automotive rim during the installation of an associated runflat device.

Another object of this invention is to provide a tool of the type described which can be adjusted to fit a variety of tire rims of different sizes, and which is extremely simple to install on and remove from a drop center type of rim.

Still another object of this invention is to provide a tool of the type described which functions not only to hold the inboard side of tire stationary during use, but is operable also to engage and draw the outboard side of a tire away from an associated rim to gain ready access to the annular space surrounding the rim inside of the tire.

Other objects of the invention will be apparent hereinafter from the specification, and from the recital of the appended claims, particularly when read in conjunction with accompanying drawings.

SUMMARY OF THE INVENTION

The tool includes an elongate rigid strap having a handle on one end and an inverted, generally U-shaped hook on its opposite end. The hook is disposed to be inserted between a tire rim and a partially mounted tire so that the closed end of the hook overlies the rim and extends upwardly into the tire in a radial plane, and with the free end of the hook engaged with the inboard tire bead. An adjustable clamp on the strap is then shifted into engagement with the outboard side of the rim to wedge the inboard tire bead between the hook and the inboard side flange of the rim.

A turnbuckle, which is pivotally mounted at one end on the upper surface of the strap, has a hook on its opposite end which is then engaged over the outboard bead of the tire, so that upon proper adjustment of the turnbuckle the outboard side of the tire will be drawn away from the rim, while the hooked end of the strap holds the inboard tire bead against the inboard side flange of the rim. The tire sidewalls are thus held in a spread or open position to enable ready insertion and mounting of a runflat device around the rim and within the tire.

THE DRAWINGS

FIG. 1 is a side elevational view of a tire sidewall separating tool made according to one embodiment of this invention;

FIG. 2 is a fragmentary sectional view taken generally along the line 2—2 in FIG. 1 looking in the direction of the arrows;

FIG. 3 is a plan view of this tool;

FIG. 4 is an enlarged, fragmentary sectional view taken transversely through an automotive tire rim having partially mounted thereon a conventional tubeless tire, and illustrating how the tool of FIGS. 1-3 is adapted to be secured to a rim in preparation for separating the sidewalls of the associated tire; and FIG. 5 is a fragmentary sectional view similar to FIG. 4, but showing the tool as it appears when engaged with the unmounted or outboard sidewall of the tire in order to spread this side of the tire away from the rim to gain access to the annular space between the tire and rim.

PREFERRED EMBODIMENTS OF THE INVENTION

Referring now to the drawings by numerals of reference, and first to FIGS. 1-3, 10 denotes generally a tire sidewall separating tool comprising an elongate, metal rod or strap 12, which is rectangular in cross-section, and which has secured across one end thereof (the left end in FIG. 1) a transversely extending handle section 13. The opposite or right end of strap 12 as shown in FIG. 1, is bent or otherwise shaped into an inverted, generally U-shaped hook 14 having spaced, parallel, integral leg sections 15 and 16, and having an inclined or beveled surface 17 formed on its terminal end.

Slidably and adjustably mounted on rod 12 between its handle section 13 and hook section 14 is a metal sleeve 21. At one side (the underside in FIG. 1) sleeve 21 is fastened to one end of a clamp element 23, the opposite end of which extends beyond one end of sleeve 21 to overlie the underside of strap 12. A first thumb screw 24 has its shank threaded through registering openings in clamp element 23 and to sleeve 21 so that its inner end is releasably engageable with the strap 12, thereby to permit sleeve 21 to be secured in an adjusted position on strap 12 relative to its hook 14. A second thumb screw 25 has its shank threaded into an opening in the outer end of clamp element 23, and into spaced registry with the strap 12 for a purpose noted hereinafter.

Mounted on and overlying the upper surface of strap 12 is a modified turnbuckle or screw shackle 31, which has adjustably threaded into opposite ends thereof the threaded shanks of screws or bolts 32 and 33. Screw 32 has a circular head 34 in the form of a closed loop, which is removably hooked over the upper end of a dogleg-shaped clip 35, which is welded or otherwise secured at its lower end to the upper surface of strap 12 adjacent to handle 13. Screw 33 has a hook 36 formed on its outer end for a purpose noted hereinafter.

In use, and as illustrated for example in FIGS. 4 and 5, when it is desired to mount a conventional safety device S on a drop center-type rim R, and within the associated tubeless tire T, one side of the tire (hereinafter the inboard side) is first inserted onto the rim so that its inboard bead B1 is seated against the inboard rim flange F1. The tool 10 is then manipulated to place its hooked end 14 in a radial plane inside of the tire T, and with its terminal end surface 17, which preferably is knurled or otherwise roughened, positioned against the inside of the tire bead B1. At the same time the sleeve 21 on the strap 12 is adjusted to engage the clip 23 over the outboard rim flange F2 at the side opposite flange F1, and in such manner that the thumb screws 24 and 25 are adjusted to secure sleeve 21 against further movement on strap 12, and to secure the inner end of screw 25 against the outer surface of the flange F2. This locks the tool 10 to the rim R in such manner that the flat surface on the underside of strap 12 forwardly of sleeve 21 engages the upper surface of the rim flange F2, thus supporting the hook 14 upright in a radial plane within the tire, and so that the terminal end 17 of the tool prevents the tire bead B1 from moving away from flange F1.

With the tool thus mounted (FIG. 4), the operator then grips and draws the opposite or outboard side of the tire T (the left side as shown in FIGS. 4 & 5) away from the rim R far enough to engage its other bead B2 in the hook 36 of the turnbuckle 31. The nut or central section of turnbuckle 31 can then be rotated, as desired, to draw the hooked section of the tire bead B2 away from the rim R and into a position such as shown in FIG. 5. This creates at opposite sides of the tool large access openings by means of which an operator can insert a runflat or safety device S into its proper position on the rim R. These rather large access openings on opposite sides of the tool 10 also permit any necessary adjustment of the safety device S and its associated parts. (As noted above, the safety device S can be of any conventional construction.)

From the foregoing, it will be apparent that the present invention provides a relatively simple and inexpensive tool for permitting ready access to the inside of a tubless tire T, which has been partially mounted onto a tire rim, thereby permitting an operator easily to insert an associated runflat or safety device on the rim within the tire. Normally the inherent tension existing between the opposed sidewalls of a tire T causes its two sidewalls closely to approach each other, and it is therefore extremely difficult to work within the annular space in the tire unless some object is employed to keep the sidewalls separated. However, heretofore, even if an object were to be employed to maintain the two sidewalls separated, the operator was still faced with the problem of retaining the inboard side of the tire (tire bead B1 as shown in the drawings) snugly against the associated rim flange during the mounting of a safety device S on the rim. The present invention solves both of these problems, in that it not only retains the inboard bead B1 temporarily fixed against the flange F1, but also functions to withdraw and retain the outboard tire bead B2 in a retracted position away from the rim, thus to provide the operator with satisfactory access to the circumferential space surrounding the outside of the rim R within the tire.

While this invention has been described as being particularly suited for use in mounting a run-flat safety device on a tire rim, it will be apparent that it can be used for a variety of reasons, and on various types of rims, whenever access to the space within a tire is desired. For example, the tool can be used to replace a valve stem, or to inspect and repair tubeless tires without having completely to remove a tire from the associated rim. In each such case only one tire bead need be broken away from the rim, which results in a substantial saving of time and effort. It will be apparent that the exact configuration of the rod or strap 12 can be modified without departing from this invention.

Moreover, while this application has been illustrated and described in connection with only one embodiment thereof, it will be apparent that it is capable of still further modification, and that this application is intended to cover any such modifications as may fall within the scope of one skilled in the art, or the appended claims.

I claim:

1. A tool for spreading the sidewalls of a tire having an inboard tire bead thereof mounted on and surrounding a tire rim, and having an outboard tire bead thereof disengaged from said rim, comprising
   a first member,
   clamping means adjustably mounted on said first member intermediate the ends thereof for releasably securing said first member on said rim with one end of said first member extending in one direction from said clamping means and between said tire and rim and into engagement with said inboard bead releasably to retain said inboard bead against a first flange formed on one side of said rim, and with the opposite end of said first member extending in the opposite direction from said clamping means and externally of said tire and beyond the opposite side of said rim, and
   spreader means mounted on said first member adjacent said opposite end thereof and operable independently of said clamping means to engage and withdraw the outboard tire bead of said tire away from said rim while said inboard bead is retained against said first flange.

2. A tool as defined in claim 1, wherein
   a hook is formed on said one end of said member and is disposed to have its closed end extend in a radial plane into the space between the sidewalls of said tire when said member is secured on said rim, and
   the terminal end of said hook has a surface thereon engagable with said inboard bead of the tire to retain said inboard bead against said first rim flange.

3. A tool as defined in claim 2, wherein said surface on the terminal end of said hook is knurled.

4. A tool s defined in claim 1, wherein
   said clamping means is adjustably mounted on said first member for movement on said first member into any one of a number of fixed ositions in which said clamp means is located adjacent said opposite side of said rim, and said clamping means includes means for releasably griping said rim adjacent said opposite side thereof thereby to secure said first member against movement relative to said rim.

5. A tool as defined in claim 4, wherein said clamp means comprises a second member slidably adjustable on said first member into any one of said fixed positions, a clamp element carried by said second member and disposed to have one end thereof overlie said opposite side of said rim, and manually adjustable means on said one end of said clamp element releasably engagable with said opposite side of said rim to secure said first member thereto.

6. A tool as defined in claim 1, wherein said spreader means comprises a first element releasably anchored at one end to said first member adjacent said opposite end thereof, and for nearly universal movement relative to said first member, a second element having on one end thereof means for releasably gripping said outboard tire bead, and means adjustably interconnecting said first and second elements and manually operable selectively to draw said first and second elements toward each other when said outboard bead is gripped by said second element thereby to effect the preading of the tire sidewalls.

7. A tool as defined in claim 1, wherein said spreader means comprises a turnbuckle anchored for nearly universal movement at one end thereof to said first member adjacent said opposite end of said first member, and having on its opposite end a hook relesably engagable with said outboard tire bead.

8. A tool for spreading tire sidewalls, comprising a first member having a hook formed on one end thereof, clamping means in said first member for releasably fixing said member intermediate its end to one side of a tire rim with said hook on said one end of said member extending in one direction from said clamping means transversely across and overlying the outer peripheral surface of th erim, and with the opposite end of said member extending in the opposite direction from said clamping means and laterally away from said one side of the rim, the terminal end of said hook being disposed to engage and retain against a flange on said opposite side of the rim the inboard tire bead of a tire which has one side only thereof mounted on said rim, and spreader means ounted for nearly universal movement about one end thereof on said first member, and having on the opposite end thereof means for relesably gripping the outboard bead of said tire, said spreader means being manually adjustable selectively to draw said gripping means relative to said clamping means and toward said one end of said spreader means, thereby to draw said outboard bead away from said inboard bead of said tire.

9. A tool as defined in claim 8, wherein said clamping means for securing said first member to said rim includes means for retaining said hook with its closed end disposed upright over said rim in a plane extending radially of said rim.

10. A tool as defined in claim 8, wherein said first member comprises an elongate, rigid strap having said hook formed on one end thereof and a handle formed on the opposite end thereof, said clamping means comprises a sleeve adjustably mounted on said strap intermediate said handle and said hook, and a clamp carried by said sleeve for movement therewith into a fixed position on said strap adjacent said one side of said rim, said clamp including a manually adjustable screw operable to engage and secure said strap to said rim when said clamp is in said fixed position.

11. A tool as defined in claim 10, wherein said spreader means comprises a turnbuckle having one end anchored to said strap for nearly universal movement relative thereto, and having on its opposite end a hook releasably engagable with said outboard bead of said tire.

* * * * *